May 28, 1968  F. C. GILMAN  3,385,573

ROTARY MATRIX, GAS CONDITIONING DEVICE

Filed May 14, 1965  2 Sheets-Sheet 1

FREDERICK C. GILMAN
INVENTOR.

BY Daniel H. Bobis
Atty

May 28, 1968  F. C. GILMAN  3,385,573

ROTARY MATRIX, GAS CONDITIONING DEVICE

Filed May 14, 1965  2 Sheets-Sheet 2

FREDERICK C. GILMAN
INVENTOR.

BY Daniel H. Bobis
Atty

United States Patent Office 3,385,573
Patented May 28, 1968

3,385,573
ROTARY MATRIX, GAS CONDITIONING
DEVICE
Frederick C. Gilman, Pompton Lakes, N.J., assignor to Worthing Corporation, Harrison, N.J., a corporation of Delaware
Filed May 14, 1965, Ser. No. 455,750
6 Claims. (Cl. 261—24)

ABSTRACT OF THE DISCLOSURE

A gas conditioning device for exchanging heat between a liquid and a gas or vapor, or for cleaning a gas, wherein gas entering a generally cylindrical chamber rotates an annular matrix element which includes a porous filter material through which the gas passes as it travels towards the outlet of the cylindrical chamber. A heat transfer or gas scrubbing liquid is distributed against the inner walls of the matrix element and is forced through the walls of the matrix element by the centrifugal force produced by the rotation of the matrix. The passage of the liquid through the matrix causes the liquid to be broken down into small droplets and thin films which insure maximum contact between the liquid and the gas being conditioned.

This invention relates to a rotary, gas conditioning device and, more particularly, to gas scrubbers and/or heat transfer devices embodying a rotating gas conditioning member which is propelled by a stream of incoming gas.

Gas scrubbers and/or heat transfer devices are well known in the art and provide an efficient means for treating industrial gases by removing therefrom certain gaseous and non-gaseous materials and particles of foreign matter, and/or heating or cooling the said gases. The gases are thereby conditioned for further application thereof, or rendered suitable for discharge to atmosphere. Centrifugal gas scrubbers and/or heat transfer devices are paticularly advantageous in many respects in that intimate contact between a gas and a cleaning and/or heat transfer liquid is fostered. Thus, if foreign particles are present in the gas, the same may be entrained in the liquid and removed thereby from the gas. In addition, and regardless of whether or not foreign particles are present in the gas, the establishment of a sufficient temperature differential between the temperature of the gas and the liquid will result in a highly efficient transfer of heat therebetween.

In the herein-disclosed preferred embodiments, the apparatus of the invention comprises a casing disposed to receive a flow of gas and to form the same into a spiraling stream against a curved wall of the said casing. A cylindrical matrix member is rotatably positioned in the casing and includes a filter portion formed essentially of a capillaceous or open pore sponge material supported by the outer surface of the matrix and having interstitial passages formed therein and a central passage extending axially therethrough. Bearing means carried on the matrix permit rotation of the latter in response to impingement of the gas against the outer surface thereof and passage therethrough. Cleaning and/or heat transfer liquid inlet and outlet means are provided in the casing whereby the said liquid may be injected into the rotating matrix through the central passage formed therein and urged therethrough by the action of centrifugal force. Gas outlet means are provided in the casing in general alignment with the said central passage, whereby the gases may travel radially inward through the matrix for the ultimate exhaust thereof from the said casing through the said outlet means. Thus, if foreign particles are present in the gas, the same will be brought into intimate contact with the liquid and entrained therein for removal thereof with the liquid through the liquid outlet means. Too, if a sufficient temperature differential is established between the gas and the liquid, the highly efficient transfer of heat therebetween will be accomplished due to the said intimate contact, regardless of whether or not there are foreign particles present in the gas which are removed therefrom by the liquid.

It is therefore an object of the invention to provide highly efficient gas conditioning devices for the cleaning and/or heat transfer treatment of gases.

Another object of the invention is the provisions of gas conditioning devices as above which comprises a rotatable element for bringing a cleaning and/or heat transfer liquid into intimate contact with a gas stream.

Another object of the invention is the provision of gas conditioning devices as above which comprise a rotatable element disposed to separately receive streams of gas, and a cleaning and/or heat transfer liquid, and to bring the said streams into intimate contact through the use of the centrifugal forces generated by the rotation of the said member.

Another object of the invention is the provision of gas conditioning devices as above which utilize the force of impingement of a gas stream on the rotatable element to rotate the same, thereby eliminating the need for separate drive means for the said element.

Another object of the invention is the provision of gas conditioning devices as above which function through the counter current flow of the gaseous and liquid streams whereby the heat transfer and/or cleaning functions thereof are performed at maximum efficiencies.

Another object of the invention is the provision of gas conditioning devices as above which, in one herein-disclosed preferred embodiment thereof, includes means which function to insure that none of the cleaning and/or heat transfer liquid remains in the gas after the conditioning thereof by the said devices.

A further object of the invention is the provision of gas conditioning devices as above which are of very economical, durable and uncomplicated design and construction, whereby costs of fabrication, installation and operation thereof are minimized, and long periods of satisfactory, maintenance free operation thereof are assured.

The above and other significant objects and advantages of the invention are believed made clear by the following detailed description thereof taken in conjunction with the accompanying drawings wherein.

Figure 1:
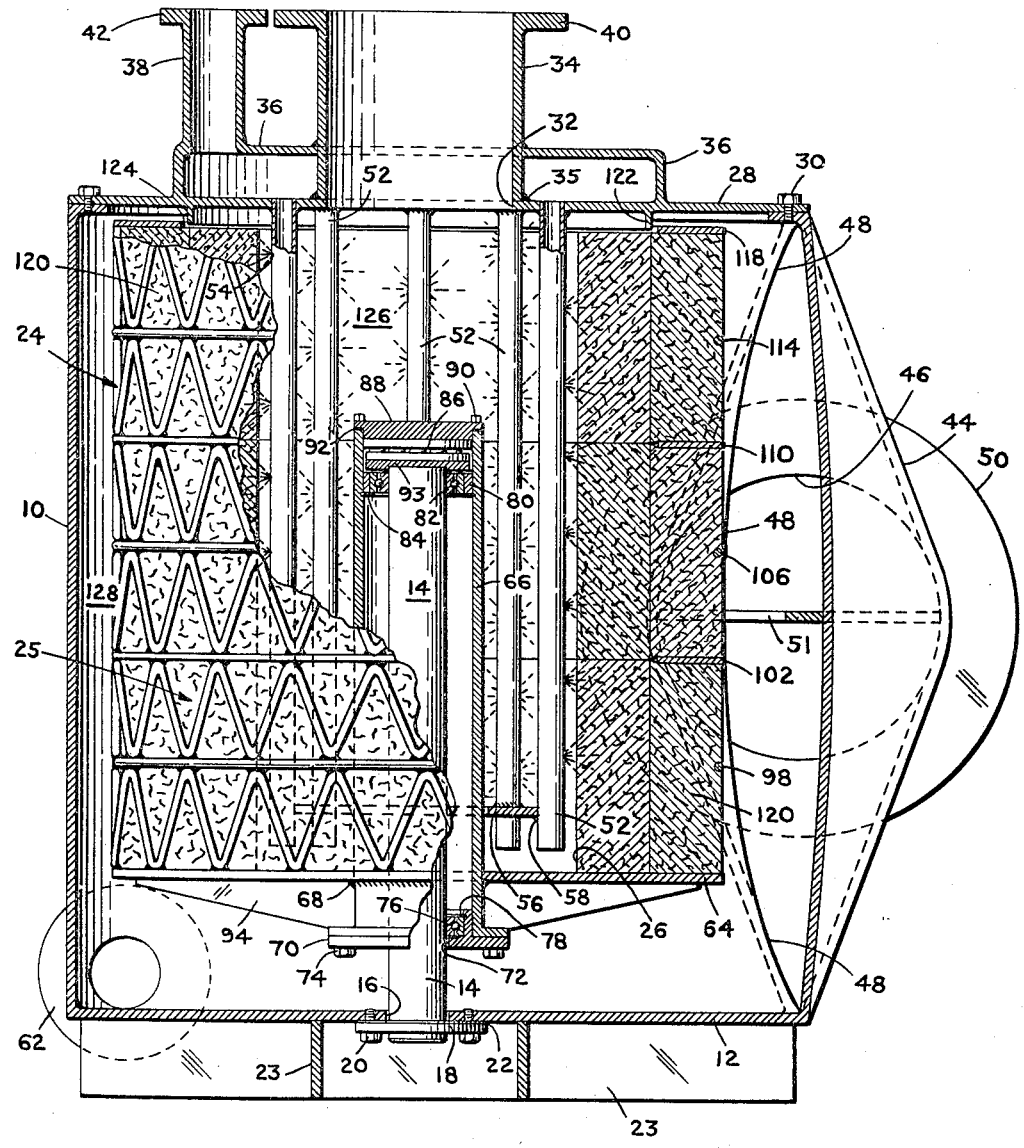
FIGURE 1 is a vertical, partially cross-sectional view of a gas conditioning device constructed in accordance with the teachings of a first embodiment of the invention, and includes parts cut away for purpose of illustration.
Figure 2:
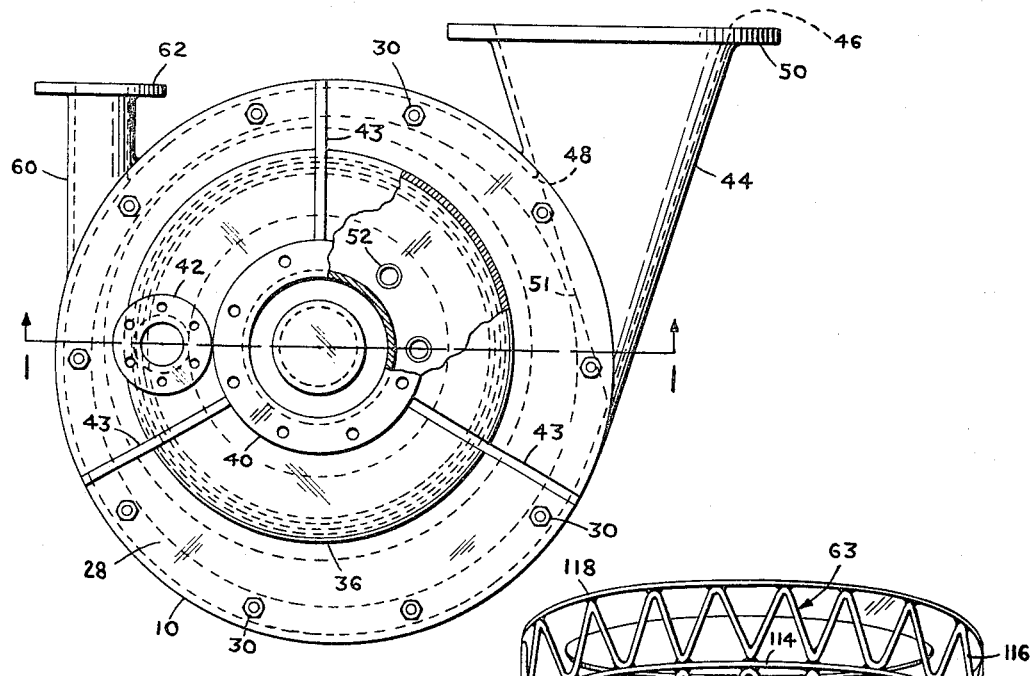
FIGURE 2 is a top plan view of the gas conditioning device of FIGURE 1.
Figure 3:
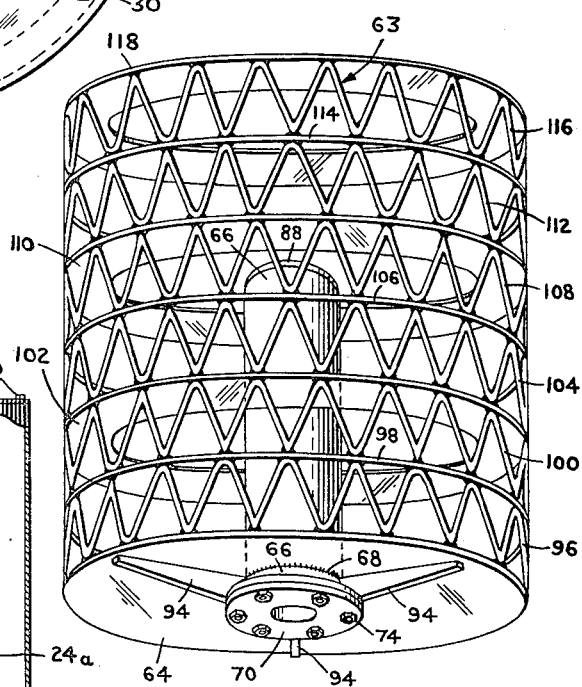
FIGURE 3 is a perspective view, with parts omitted for purposes of illustration, of the rotatable matrix of the gas conditioning devices of the invention.

Referring now to the drawings, FIGURES 1 through 3 illustrate a preferred embodiment of the invention which comprises a substantially cylindrical casing 10 disposed as shown in an upright position and including a bottom wall or mounting base 12. The casing 10 is constructed from any readily available, fluid-tight material of suitable strength and temperature-resistant characteristics, as for example metal or reinforced plastic.

An upstanding post assembly is generally indicated at 14 and extends as shown through a slightly eccentrically disposed opening 16 formed in the said mounting base. The said post assembly is supported, in a slightly eccentric manner relative to the casing 10, from the said mounting base by a flange member 18 and attachment bolts 20 extending as shown therebetween, and a sealing gasket 22 is compressibly retained between the said flange member and mounting base to prevent gas and/or liquid leakage out of the casing 10 through the opening 16. Stiffening ribs 23 may be provided as shown on the mounting base 12 to increase the structural rigidity thereof.

A generally cylindrical matrix assembly is generally indicated at 24 and is rotatably supported, in the depicted slightly eccentric manner relative to the interior side walls of the casing 10, from the post assembly 14, as described in detail hereinbelow. The said matrix assembly includes a filter portion, generally indicated at 25, and a centrally disposed, substantially axial passage 26 extending therethrough.

A cover member 28, preferably constructed from the same fluid-tight material as the casing 10, is secured as shown in a fluid-tight manner over the open upper end of the said casing by attachment bolts 30 extending therebetween. The said cover member includes a slightly eccentrically disposed opening 32 formed therein in substantial alignment with opening 16 in mounting base 12, and a gas outlet conduit 34 attached thereto and extending upwardly therefrom, in fluid flow communication with the opening 32 by welding as indicated at 35.

A generally annular liquid inlet manifold 36 is formed as shown by spaced walls of the cover member 28, and includes a liquid inlet conduit 38 extending upwardly therefrom.

The gas outlet conduit 34, and the liquid inlet conduit 38 include attachment flanges 40 and 42, respectively, formed on the remote extremities thereof for the convenient, fluid flow attachment of the said conduits to suitable receivers of the gas, and sources of supply of the liquid respectively. Stiffening ribs 43 (FIGURE 2) may be attached to the upper side of the cover member 28 to increase the structural rigidity thereof.

A flared, gas inlet conduit 44 extends generally tangentially, as best seen in FIGURE 2, from the casing 10, and is disposed relative to the generally cylindrical matrix assembly 24 so that a stream of gas being introduced into the casing 10 through the said gas inlet conduit will impinge upon and rotate the said matrix assembly at a rotational velocity proportional to the mass flow and entrance velocity of the said stream of gas, and the quantity of liquid passing through the matrix assembly 24 as described in detail hereinbelow. The gas inlet conduit 44 may be best seen in FIGURES 1 and 2 to be shaped in the nature of a transition piece, with the gas inlet opening 46 formed therein being of generally circular configuration, and the gas outlet opening 48 formed therein at the juncture thereof with the casing 10 being of generally semi-eliptical configuration and extending throughout substantially the entire axial extent of the casing 10, whereby the incoming stream of gas will impinge upon the matrix assembly 24 throughout the entire axial extent thereof as is believed made clear by FIGURE 1.

The gas inlet conduit 44 is preferably welded to the casing 10 at the juncture thereof, in a non-illustrated manner, to provide a fluid-tight connection therebetween. An attachment flange 50 is formed as shown on the remote extremity of the said gas inlet conduit for the convenient connection thereof to a suitable source of gas supply. A reinforcing plate 51 extends as shown (FIGURES 1 and 2) across the gas inlet conduit 44 for reinforcing the casing 10 in the area of opening 48, and is supported in the depicted position thereof in any convenient manner, as for example by welding to the interior wall of the said gas inlet conduit.

A generally circular array of preferably equally spaced liquid distribution pipes 52 extend as shown through openings provided therefor in the cover member 28 into fluid flow communication with the liquid inlet manifold 36, and extend downwardly therefrom into the central passage 26 formed in the matrix assembly 24. The said liquid distribution pipes may include nozzle means 54 inserted in longitudinally spaced openings provided therefor in the said pipes for directing liquid under pressure therefrom against the inner wall of the matrix assembly which define the passage 26. Alternatively, constricted openings may be formed in the said water distribution pipes in the same longitudinally spaced manner and utilized in lieu of the said nozzles for the same purpose. The said nozzles, or openings, may be oriented in the said liquid distribution pipes to direct liquid in generally radial directions against the said matrix assembly inner wall, or alternatively, the orientation thereof may be established to direct liquid in generally tangential directions relative to the said matrix assembly inner wall to minimize liquid splashing.

The liquid distribution pipes 52 may be retained in the openings provided therefor in the cover member 28 in any convenient manner, as for example by welding or force fits, and a support ring 56 is preferably welded, as indicated at 58, to the said liquid distribution pipes adjacent the respective lower extremities thereof for obvious purpose. Thus may be clearly understood whereby the cover member 28, including the liquid inlet conduit 38, the liquid inlet manifold 36, the gas outlet conduit 34, and the circular array of liquid distribution pipes 52, may be conveniently removed as a unit from the casing 10 by the simple removal of the attachment bolts 30.

A liquid outlet conduit 60 extends as shown from the bottom or sump of the casing 10 in fluid flow communication therewith. The said liquid outlet conduit is preferably welded to the said casing at the juncture thereof, in a non-illustrated manner, to provide a fluid-tight connection therebetween, and includes an attachment flange 62 formed on the remote extremity thereof for convenient attachment to suitable means for receiving liquid discharged from the said casing.

The framework of the matrix assembly 24 is generally indicated at 63 in FIGURE 3 and, as seen therein, comprises a generally circular base plate 64 with a centrally disposed opening formed therein. A cylindrical, bearing support sleeve 66 extends as shown through the said centrally disposed opening and is attached to the said base plate by welding as indicated at 68. A bearing support cap 70, including a centrally disposed opening 72 formed therein through which the support shaft 14 extends as shown in FIGURE 1, is attached to the suitably flanged lower extremity of the bearing support sleeve 66 by attachment bolts 74 extending therebetween. A journal bearing 76 (FIGURE 1) is supported as shown from the bearing support cap 70 and retained therein by bearing retainer ring 78 extending therebetween.

A bearing support ring 80 is positioned as shown (FIGURE 1) in the bearing support sleeve 66 adjacent the upper extremity of the support post 14, as for example by a press fit, and a journal bearing 82 is supported therefrom and retained therein by a bearing retainer ring 84 extending therebetween.

A thrust bearing 86 is positioned as shown within the upper extremity of the bearing support sleeve 66, and an end cap 88 is attached to the said extremity of the bearing support sleeve, in a fluid-tight manner, by attachment bolts 90 and a compressible seal gasket 92 extending therebetween, with the lower surface of the said end cap being in abutment with the upper surface of the said thrust bearing. A spacer member 93 is carried from the top of the support post and is in abutment with the lower surface of the thrust bearing 86. Thus is believed made clear whereby the weight of the matrix assembly 24 is borne, through the said end cap-thrust bearing-spacer member surface abutment, by the support post 14, while the respective journal bearings 76 and 82, and the said thrust bearing, enable the free rotation of the matrix assembly 24 relative to the said support post. In addition it may be noted that the fluid-tight seal between the said end cap and bearing support sleeve prevents the undesirable entry of liquid and/or gas into the interior of the said bearing support sleeve and contact thereof with the said thrust and journal bearings. Also, the bearings 76, 82 and 86 may be of type and material unharmed by contact with the liquid or gas. Further is believed made clear that removal of the cover plate 28 as described in detail hereinabove, makes possible the convenient removal from the casing 10 of the matrix assembly 24 as a unit without further disconnections.

Returning to the construction of the matrix assembly framework as seen in FIGURE 3, support ribs 94 may extend between the base plate 64 and the bearing support sleeve 66 to increase the structural rigidity of the matrix assembly. The outer portion of the matrix assembly framework which extends upwardly from the base plate 64 is of generally "stacked" construction comprising a bent rod member 96, a connecting ring 98, a bent rod member 100, a circular support sheet 102, a bent rod member 104, a connecting ring 106, a bent rod member 108, a circular support sheet 110, a bent rod member 112, a connecting ring 114, a bent rod member 116, and a circular support sheet 118, respectively welded together at all points of contact therebetween in the depicted positions thereof, to complete the matrix assembly framework.

The respective support sheets 102, 110 and 118 function to lend stiffness to the generally cylindrical shape of the matrix assembly framework and, in conjunction with the base plate 64, the bent rod members 96, 100, 104, 108, 112 and 116, and the connecting rings 98, 106, 114, to support and retain bodies 120 (FIGURE 1) of a capillaceous material such as fibrous or shredded, metal, plastic, or other substance adapted to the retention of a liquid for contacting a passing gas stream, within the matrix framework. The said capillaceous material may take the form of semi-rigid bats or sections, or be loosely packed in screen containers which are in turn fastened to the said bent rod members in any convenient manner.

A circular sealing ring 122 extends as shown (FIGURE 1) downwardly from the under surface of the cover member 28 into the opening 124 provided in the support sheeet 118 of the matrix assembly 24. The said sealing ring may extend as shown to a location just adjacent the matrix assembly to enable the free rotation of the latter or, alternatively, may extend into loose, rubbing contact with the said assembly in a non-illustrated manner to thus present some slight frictional resistance to the free rotation thereof. In addition, non-illustrated flexible seal means may, if desired, be interposed between the said sealing ring and matrix assembly in any convenient manner. The sealing ring 122 provides, in any event, an annular barrier between the chamber 126 formed in the interior of the matrix assembly 24 by the base plate 64 and the walls of passage 26, and the chamber 128 formed by the remaining area of the interior of the casing 10 not occupied by the said matrix assembly. Thus, fluid flow communication between the chambers 126 and 128 is substantially restricted to fluid flow through the bodies 120 of capillaceous material of the matrix assembly.

The rotational speed of the matrix assembly 24 may be maintained substantially constant by maintaining the velocity and mass flow of the incoming gas substantially constant. It is, however, within the purview of the invention to employ non-illustrated, matrix assembly braking means to enable more precise control of the said rotational speed. Such braking means may, for example, take the form of mechanical braking means cooperatively associated with the said matrix assembly in any convenient manner. Alternatively, the provision of the said braking means may encompass the orientation of some or all of the nozzles 54 (FIGURE 1) to direct streams of liquid generally tangentially against the walls of the matrix passage 26 in a direction opposed to the direction of rotation of the matrix assembly, or may encompass the inclusion of separate, non-illustrated nozzle means with controllable flow directed generally tangentially against the outer surface of the matrix assembly in the same manner.

Figure 4:
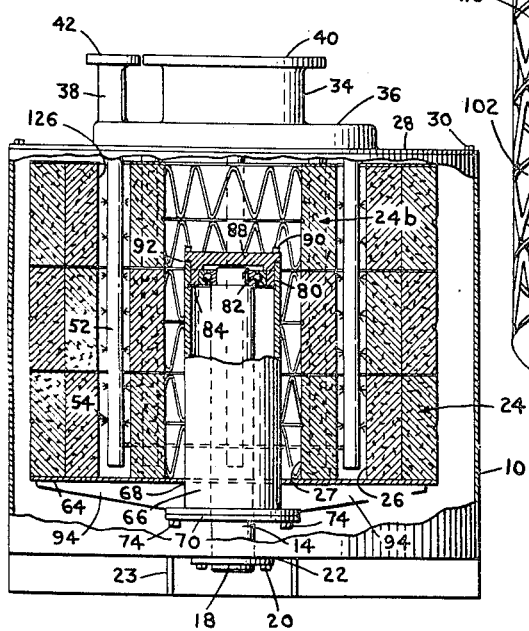
FIGURE 4 is a vertical, partially cross-sectional view of a gas conditioning device constructed in accordance with the teachings of a second embodiment of the invention, and includes parts cut away for purposes of illustration.

The gas conditioning device of the preferred embodiment of FIGURE 4 is of the same general construction as the gas conditioning device of the preferred embodiment of FIGURES 1 through 3, whereby the same reference numerals are utilized to identify the same elements in all figures. The gas conditioning device of FIGURE 4 differs in part from the gas conditioning device of FIGURES 1 through 3 in that a generally annular, axially extending passage 126 is formed as shown in the matrix assembly 24 in addition to an axially extending passage 27 formed therein. This may be readily accomplished, for example, by constructing inner and outer matrix assemblies 24a and 24b of different radial dimensions, in the same manner described in detail hereinabove for the construction of matrix assembly 24, and positioning the said matrix assemblies in a generally concentric manner on the base plate 64 as indicated in FIGURE 4 to form the generally annular passage 126 therebetween.

In addition, the positioning of the water liquid distribution pipes 52 in the cover member 28 is modified as shown so that the said liquid distribution pipes extend downwardly into the matrix passage 26 rather than the matrix passage 27. Thus, the flow of liquid from the said pipes into the matrix passage 27 is substantially inhibited by the matrix assembly 24b, as should be obvious, whereby the gas discharged from the gas conditioning device of the preferred embodiment of FIGURE 4 through the gas outlet conduit 34 will be substantially liquid free. Too, separate thrust bearing 86 is eliminated, and bearing 82 utilized for both thrust and alignment purposes as shown, in cooperation with shoulders formed on support post 14, to support the weight of the matrix assembly.

Figure 1A:
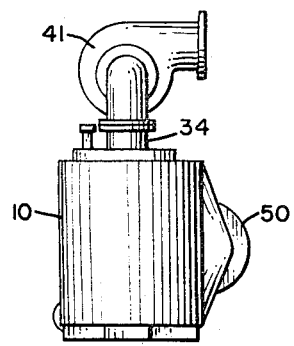
FIGURE 1A is a vertical view of a gas conditioning device constructed in accordance with the teachings of the invention including a blower on the gas outlet of the device to facilitate gas flow through the device.

In operation of the gas conditioning device of FIGURES 1 through 3, as for example in the scrubbing of process gas to remove foreign particles, or absorb noxious gas components, therefrom, through the use of water as a cleaning liquid, the gas inlet conduit 44 is connected to a suitable source of the said process gas under sufficient pressure to result in the flow thereof into the casing 10 at sufficient velocity and mass flow to rotate the matrix assembly 24 at the desired rate, and the gas outlet conduit 34 is similarly connected to a suitable receiver for the scrubbed gas. In cases wherein the process gas is not at sufficient pressure at the source thereof, suitable suction means such as the centrifugal blower 41 shown in FIGURE 1A may, if desired, be connected to the gas outlet 34 to effect the flow of the process gas into the casing 10 at the requisite velocity and mass flow.

Liquid inlet conduit 38 is similarly connected to a suitable source of water under sufficient pressure to result in the flow thereof through the nozzles 54 (FIGURE 1) of the water distribution pipes 52 at the desired flow rate, and liquid outlet conduit 60 connected to a suitable receiver for the removal of used water from the casing 10.

Operation of the gas conditioning device is then commenced, as for example by the opening of non-illustrated flow control valves, to commence the respective flows of the particle laden process gas, and the water, through the said device. As the stream of particle laden gas enters the chamber 128 in the casing 10 through opening 48 (FIGURE 1), the same will commence to impinge upon the outer surface of the matrix assembly and pass through the latter throughout the entire axial extent thereof to commence rotation of the said assembly as described in detail hereinabove.

As the pressurized particle laden process gas fills the chamber 128, the said gas will commence to flow through the bodies 120 of capillaceous material toward the chamber 126 overcoming friction and centrifugal force.

Concurrently therewith, the water discharged from the nozzles 54, within the chamber 126, against the wall of the axially extending passage 26 of the matrix assembly will commence to flow through the bodies 120 of capillaceous material toward the chamber 128 due to the greater centrifugal force exerted theron by the rotation of the water with the matrix assembly. This will result in the said jets of water being broken up into very small droplets and surface films to provide maximum surface area thereof for intimate contact with the particle laden, process gas. In addition, the structural nature of the bodies 120 of capillaceous material will result in the said water droplets and surface films adhering thereto and, to some extent, in the retardating of the flow of the said surface films and water droplets therethrough, to increase the time of contact between the said surface films and water droplets, and gas, and contribute further to the efficiency of the gas scrubbing operation.

Thus may be understood whereby counter-current flow of the small droplets and surface films of water, and the particle laden, process gas, through the said bodies will occur, whereby the latter will be brought into intimate contact with the former and said particles accordingly removed from the process gas by the entrainment thereof in the said water droplets and surface films.

As the now substantially particle free process gas reaches the chamber 126, the same will flow upwardly therefrom through the gas outlet conduit 34 from which it may be conveniently flowed to a suitable receiver therefor, for re-use thereof, or discharged to atmosphere without fear of air pollution, as the case may be. Similarily, as the now particle laden water reaches the chamber 128, the same will be thrown against the interior side wall of the casing 10 and collect by gravity in the bottom or sump thereof for removal through the water outlet conduit 62 and further use or discharge to waste thereof, as the case may be. The operation of the gas conditioning device of the invention for heat transfer purposes between a gas and liquid is substantially the same as just described for the scrubbing of a gas. In such cases it is, of course, essential however that a sufficient differential exist between the respective inlet temperatures of the gas, and liquid, so that heat transfer therebetween is made possible. Thus, for example, in the cooling of a process gas through the use of water, the inlet temperature of the water at the nozzles 54 must be maintained sufficiently below the inlet temperature of the process gas at the opening 48 to make possible heat transfer therebetween as a result of the intimate, and relatively prolonged contact between the said gas and water during the counter-current flows thereof through the bodies 120 of capillaceous material.

It is believed clear that the scrubbing and heat transfer functions may be performed concurrently by the gas conditioning device of the invention. Thus, a particle laden process gas may conveniently be scrubbed and cooled, concurrently, by flowing the same through the gas conditioning device of the invention concurrently with the flow of water, at an inlet temperature sufficiently below the inlet temperature of the process gas for heat transfer purposes, through the said device as described in detail hereinabove. It is also believed clear that the gas conditioning device of the invention is equally adapted to the heating of gases by liquids, and to the heating or cooling of liquids by gases, and that gases other than process gases, and liquids other than water, are equally well adapted for conditioning thereby.

The operation of the preferred embodiment of FIGURE 4 is substantially the same as the operation of the preferred embodiment of FIGURES 1 through 3 with the exception that the introduction of the liquid in the axially extending passage 126 between the matrix assemblies 24a and 24b, and the liquid flow retarding characteristics of the latter matrix assembly, will substantially inhibit the flow of the liquid into the matrix passage 26, whereby the conditioned gas discharged from the latter passage will be substantially free of liquid. Thus, the gas conditioning device of FIGURE 4 will find particular adaptability in gas scrubbing and/or heat transfer applications wherein the presence of liquid in the conditioned gas may not be tolerated.

What is claimed is:

1. In a gas conditioning device, cylindrical casing means, cylindrical matrix means constructed to enable fluid flow therethrough, support means for rotatably supporting said matrix means within said casing means, said support means including a frame work for the matrix consisting of a series of rods, connecting rings, and circular support sheets, said matrix means disposed eccentrically relative to said casing means, said matrix means comprising passage means extending thereinto and forming a first chamber within said casing means, said matrix means and said casing means cooperating to form a second chamber within said casing means but without said matrix means, seal means cooperatively associated with said casing means and said matrix means to restrict fluid flow between said first and second chambers to fluid flow through said matrix means, gas inlet means in said casing means in communication with said second chamber, said gas inlet means disposed tangentially relative to said casing and extending the axial length of said matrix to receive a stream of gas from a source of supply thereof and direct the same against said matrix means in a tangential direction to effect the rotation of the latter, gas outlet means communicating with said first chamber for receiving gas therefrom, liquid inlet means including pipe means extending into said passage means and means in said pipe means for directing liquid therefrom against the wall of said first chamber, and liquid outlet means communicating wtih said second chamber for receiving liquid therefrom whereby, gas may be introduced into said second chamber through said gas inlet means, be directed against said matrix means to effect the rotation thereof, and flow through said matrix means to said first chamber and therefrom to said gas outlet means, while liquid may be concurrently introduced into said first chamber through said liquid inlet means and may flow therefrom through said matrix means under the influence of centrifugal force generated by the rotation of said matrix means to said second chamber and therefrom to said liquid outlet means, said gas and said liquid being brought into intimate contact during the counter-current flows thereof through said matrix to enable conditioning of the gas by the liquid.

2. In a gas conditioning device as in claim 1 wherein, said matrix means comprise a filter portion formed essentially of an open pore material having interstitial passages formed therein.

3. In a gas conditioning device as in claim 1 further comprising, means to establish a slight pressure differential between said second and first chambers to promote the flow of gas therebetween.

4. In a gas conditioning device as in claim 1, said matrix means further comprising inner and outer matrix means, said passage means forming an annular passage between said inner and outer matrix means, said pipe means extending into said annular passage to direct liquid against the walls of said inner and outer matrix means, said inner matrix means further comprising second passage means in fluid flow communication with said gas outlet means, and said seal means associates with said inner matrix means.

5. The gas conditioing device as in claim 4 further comprising means to establish a slight pressure differential between said second chamber and said first chamber to promote a flow of gas therebetween.

6. The gas conditioning device as in claim 4 wherein said matrix means comprise a filter portion formed essentially of an open pore material having interstitial passages formed therein.

References Cited

UNITED STATES PATENTS

| 1,072,849 | 9/1913  | Hart          | 261—79    |
| 1,139,385 | 5/1915  | Theisen       | 261—90 X  |
| 2,259,762 | 10/1941 | McKee         | 261—90 X  |
| 2,562,589 | 7/1951  | Uttz          | 261—99    |
| 2,698,745 | 1/1955  | Boucher       | 55—230 X  |
| 2,941,872 | 6/1960  | Pilo et al.   | 261—84 X  |
| 3,149,626 | 9/1964  | Wentling et al.| 261—92 X |

FOREIGN PATENTS

| 569,930 | 6/1945  | Great Britain. |
| 819,240 | 10/1951 | Germany.       |
| 859,097 | 1/1961  | Great Britain. |

RONALD R. WEAVER, *Primary Examiner.*

UNITED STATES PATENT OFFICE
CERTIFICATE OF CORRECTION

Patent No. 3,385,573                            May 28, 1968

Frederick C. Gilman

It is certified that error appears in the above identified patent and that said Letters Patent are hereby corrected as shown below:

In the heading to the printed specification, line 5, "Worthing Corporation" should read -- Worthington Corporation --.

Signed and sealed this 18th day of November 1969.

(SEAL)
Attest:

Edward M. Fletcher, Jr.                       WILLIAM E. SCHUYLER, JR.
Attesting Officer                               Commissioner of Patents